United States Patent [19]

Hiramoto

[11] Patent Number: 5,198,184
[45] Date of Patent: Mar. 30, 1993

[54] REACTOR CONTAINMENT VESSEL
[75] Inventor: Makoto Hiramoto, Yokohama, Japan
[73] Assignee: Kabushiki Kaisha Toshiba, Kawasaki, Japan
[21] Appl. No.: 910,510
[22] Filed: Jul. 8, 1992
[30] Foreign Application Priority Data
   Jul. 8, 1991 [JP] Japan ................. 3-166621
[51] Int. Cl.⁵ ........................... G21C 13/024
[52] U.S. Cl. ..................... 376/283; 376/293; 376/461
[58] Field of Search ............... 376/283, 293, 461
[56] References Cited
   U.S. PATENT DOCUMENTS
   5,091,143  2/1992  Tate et al. ............... 376/299

Primary Examiner—Daniel D. Washl
Attorney, Agent, or Firm—Oblon, Spivak, McClelland, Maier & Neustadt

[57] ABSTRACT

A reactor pressure vessel is disposed in a reactor containment vessel and is supported by a pedestal having a cylindrical structure. The inside of the reactor containment vessel is divided into upper and lower drywells by means of a diaphragm floor. A line, a cable and a duct are disposed in and between the upper and lower drywells in the reactor containment vessel. The pedestal comprising a plurality of concrete wall sections and a plurality of connecting vent sections which are arranged alternately along a circumferential direction of the cylindrical pedestal, wherein the line, the cable and the duct are arranged in each of the connecting vent sections and a vent pipe is arranged in each of the concrete sections. A vacuum breaker is further disposed in the reactor containment vessel at a portion above the open end of the vent pipe, the vacuum breaker is connected to a fixing pipe for mounting a vacuum breaker to the pedestal and the fixing pipe has one end opened to the drywell. The vent pipe may have an end portion extended to the diaphragm floor and opened to the drywell and a vacuum breaker is mounted to the extended portion of the vent pipe and connected to a fixing pipe for mounting a vacuum breaker to the pedestal, the fixing pipe having one end opened to an inside of the vent pipe.

4 Claims, 8 Drawing Sheets

REACTOR CONTAINMENT VESSEL

BACKGROUND OF THE INVENTION

The present invention relates to a reactor containment vessel containing a reactor pressure vessel, and more particularly, to a reactor pressure vessel supporting pedestal having an improved structure.

Generally, as shown in FIG. 7, a reactor primary containment vessel (PCV) 1 contains a reactor pressure vessel (RPV) 2. The PCV 1 is composed of an outer wall structure W, in the inside of which an upper drywell 5 is formed and a lower drywell 7 is also formed below the upper dry well 7. A suppression chamber 8 for absorbing steam energy discharged in the upper and lower dry wells 5 and 7 at a reactor accident is formed inside the wall structure W. In the upper drywell 5, the RPV 2, a line 3 connected to the RPV 2 and an air conditioning system 4 are disposed, and in the lower drywell 7, a control rod driving mechanism 6 and others are disposed.

The RPV 2 is supported by a pedestal 12 which is supported at one end by the outer wall structure W through a diaphragm floor 22 and has a cylindrical structure surrounding the RPV 2. A line 9, a cable 10 and a duct 11 are also arranged in the upper and lower drywells 5 and 7, and a connecting vent 13 is formed to the pedestal 12 to pass the line 9, the cable 10 and the duct 11. In an actual design, a plurality of these line, cable and duct may be arranged, but in the illustration, only the cables 10 are shown as plural. This connecting vent 13 serves as a flow passage for guiding the steam discharged from the line, which is broken in an reactor accident, into a vent pipe 14 which is disposed at the lower portion of the pedestal 12. The steam is then guided into the suppression chamber 8 in which the steam is condensed as a suppression pool water 25.

In such accident, since non-condensable gas such as nitrogen gas is also flown into the suppression chamber 8 as well as the steam, the pressure inside the suppression chamber 8 increases.

Upon breaking the line or duct, the pressure inside the upper and lower drywells 5 and 7 also increase. However, coolant is supplied through a core cooling system at such emergency, and when the broken portion of the line or duct is filled up with the coolant, the steam in the upper and lower dry wells 5 and 7 are condensed as suppression pool water 25, thus rapidly decreasing the pressure inside the drywells 5 and 7. When the pressure inside the drywells 5 and 7 is rapidly lowered, a pressure load is severely applied to the diaphragm floor 22 formed as a partition wall sectioning the upper and lower drywells 5 and 7. In order to prevent such pressure load from appling to the diaphragm floor 22, vacuum breakers 24 are mounted to the pedestal by means of mounting or fixingpipes 23, respectively, as shown in FIGS. 9 and 10. Namely, when a difference in pressures inside the upper drywell 5 and the lower drywell 7 exceeds a predetermined value, the vacuum breakers 24 are operated to flow the gas inside the lower drywell 7 into the suppression chamber 8. These vacuum breakers 24 are disposed in plural numbers along the circumferential direction of the pedestal 12 as shown in FIG. 10.

Generally, in the PCV 1, a plurality of internal pumps are arranged inside the PCV 1 along a circumferential direction of a reactor core disposed in the RPV 2 with predetermined spaces with each other and a plurality of vent pipes 14 are also arranged along the circumferential direction of the RPV 2 generally at positions corresponding to the internal pumps.

Namely, as shown in FIG. 8, the pedestal 12 is sectioned into a plurality of the connecting vents or passages 13 and a plurality of concrete wall sections 12a, which are alternately arranged along the circumferential direction of the pedestal 12. The pedestal 12 is lined by steel plates, for example, and accordingly, each of the connecting vents 13 is defined by the adjacent concrete sections 12a and the inner and outer steel plates.

In such arrangement, however, as shown in FIG. 8 shown as sectional view taken along the lines VIII—VIII in FIG. 7, the line 9, the cables 10, the duct 11 and other elements are disposed in the connecting vent 13 above each of the vent pipe 14, so that it is difficult to ensure a sufficient steam flow area for the vent pipe 14 at a time of accident of the reactor.

Moreover, as shown in FIG. 9 or 10, the fixing pipe 23 to which the vacuum breaker 24 is secured penetrates the connecting vent 13 above the vent pipe 14, so that the location of the vacuum breaker 24 and the fixing pipe 23 is complicated, thus being disadvantageous.

SUMMARY OF THE INVENTION

An object of the present invention is to substantially eliminate defects or drawbacks encountered in the prior art and to provide a reactor containment vessel including a pedestal having an improved structure capable of ensuring an enough space for steam flow in the drywell to a vent pipe at a reactor accident.

Another object of the present invention is to provide a reactor containment vessel including a pedestal having an improved structure to which a vacuum breaker means is mounted at an appropriate position for easy construction.

These and other objects can be achieved according to the present invention by providing a reactor containment vessel having an outer wall structure an inside of which is divided into upper and lower drywells by means of a diaphragm floor and in which a suppression chamber is arranged, a reactor pressure vessel is supported by a pedestal and a line, a cable and a duct are disposed in and between the upper and lower drywells, the pedestal having a cylindrical structure surrounding the reactor pressure vessel, the pedestal comprising a plurality of concrete wall sections and a plurality of connecting vent sections which are arranged alternately along a circumferential direction of the cylindrical pedestal, wherein the line, the cable and the duct are arranged in each of the connecting vent sections and a vent pipe is arranged in each of the concrete sections so that the line, the cable and the duct and the vent pipe occupy different positions in their cross sections, the vent pipe having an open end opened to the drywell.

In modified or preferred embodiments, a vacuum breaker means is further disposed in the reactor containment vessel at a portion above the open end of the vent pipe, the vacuum breaker means including a fixing pipe for mounting a vacuum breaker to the pedestal, the fixing pipe having one end opened to the drywell. The vent pipe may have an end portion extended to the diaphragm floor and opened to the drywell and a vacuum breaker means is further disposed in the reactor containment vessel, the vacuum breaker means being mounted to the extended portion of the vent pipe and including a fixing pipe for mounting a vacuum breaker to the pedestal, the fixing pipe having one end opened to an inside of the vent pipe.

According to the characters and structures of the reactor containment vessel of the present invention, the structure of the pedestal is sectioned into a plurality of connecting vent sections in each of which the line, the cable and the duct are arranged and a plurality of concrete wall sections in each of which the vent pipe is disposed. Accordingly, the portion of the drywell above the open end of the vent pipe is formed as a vacant space in which no cable and line are arranged, whereby the steam flow is not obstructed at the reactor accident. In this connection, the vacuum breaker is disposed easily with a simple manner in association with the arrangement of the vent pipe, whereby the pedestal having an improved structure can be provided.

The nature and further characteristic features of the present invention will be made more clear from the following descriptions with reference to the accompanying drawings.

DESCRIPTION OF THE PREFERRED EMBODIMENTS

One preferred embodiment of the present invention will be described hereunder with reference to FIGS. 1 to 2.

Figure 1:
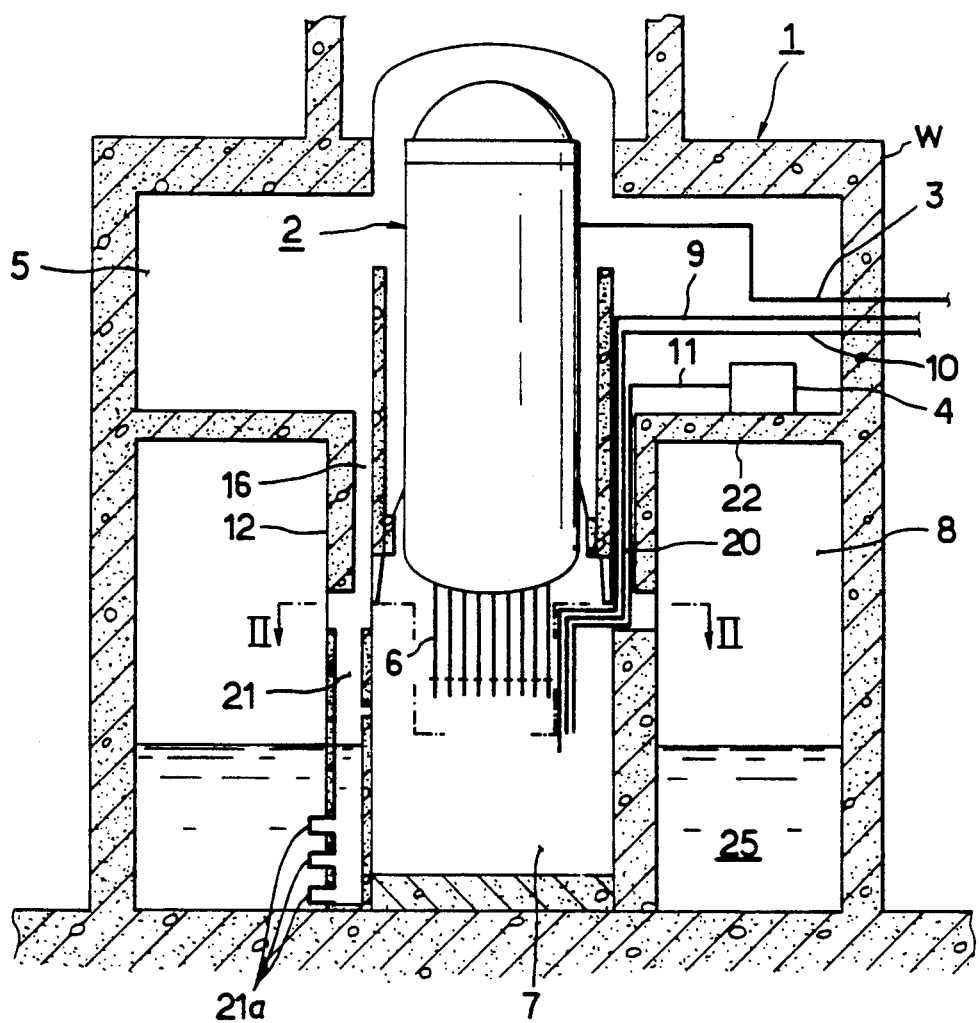
FIG. 1 is an elevational section of a reactor containment vessel including a pedestal having an improved structure according to the present invention.
Figure 7:
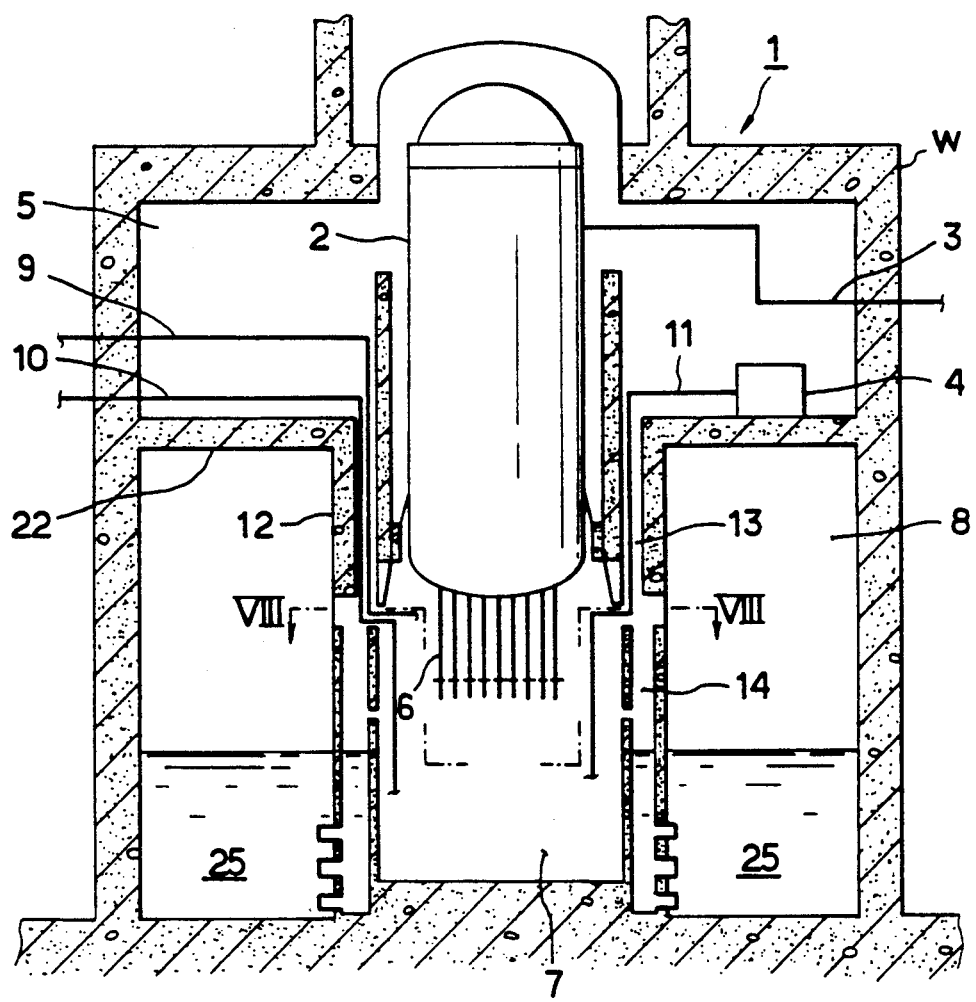
FIG. 7 is an elevational section similar to FIG. 1, but is related to a conventional structure of the reactor containment vessel.

FIG. is an elevational section similar to that of FIG. 7, and in FIG. 1, like reference numerals are added to elements and members corresponding to those shown in FIG. 7 and descriptions relating thereto are omitted here.

Figure 2:
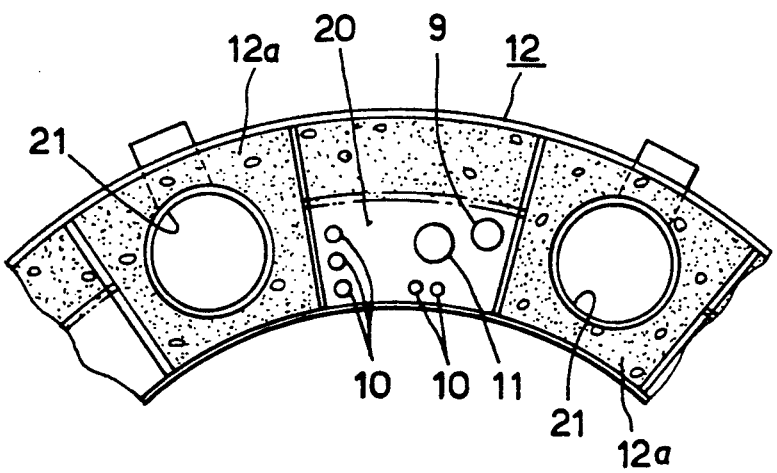
FIG. 2 is partial sectional view taken along the line II—II in FIG. 1 for showing the arrangement of lines, cables and vent pipes.
Figure 8:
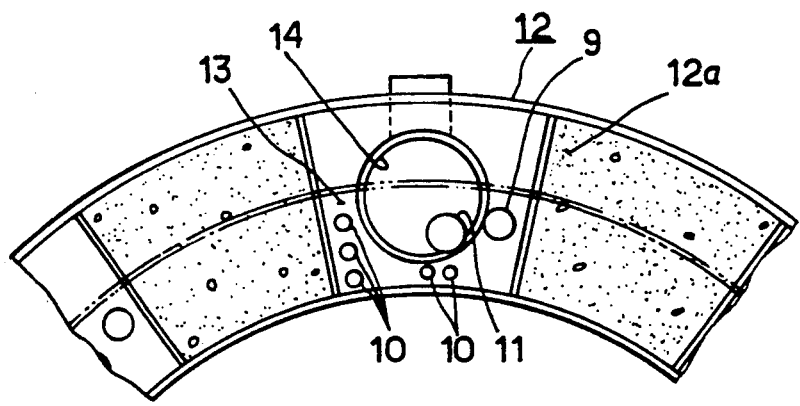
FIG. 8 is partial sectional view taken along the line VIII—VIII in FIG. 7, corresponding to the section of FIG. 2.

Referring to FIGS. 1 to 2, the pedestal 12 has a cylindrical structure surrounding the RPV 2 and has a cross section partially shown in FIG. 2 taken along the line II—II in FIG. 1, which will be easily compared with the cross section of FIG. 8.

Namely, as can be seen from FIG. 2, according to the present invention, the pedestal 12 is composed of a plurality of concrete wall sections 12a and connecting vents or passage sections 20 which are arranged alternately along the circumferential direction of the pedestal 12. The line 9, the cables 10 and the duct 11 communicating the upper dry well 5 with the lower dry well 7 are arranged within the connecting vent sections 20 and vent pipes 21 are disposed in the concrete wall sections 12a, respectively. The inner and outer surfaces of the pedestal 12 are lined by steel plates, for example. The vent pipe 21 is embedded in the concrete wall section 12a of the pedestal 12 so as to extend vertically and has an upper end opening opened outward to the drywell. The vent pipe is provided with a venting port 21a at its lower portion so as to communicate with the interior of the suppression chamber 8. The space above the vent pipes 21 is formed as vacant space 16 in the PCV 1. According to this arrangement, since the vacant space 16 is formed above the upper opening of each of the vent pipes 21, so that a space necessary for the steam flow passage at the reactor accident can be ensured without being obstructed by the arrangement of the line 9, the cables 10 and the duct 11. This advantage can be clearly understood in comparison with FIGS. 2 and 8 as cross sections.

In this embodiment of the present invention, the numbers and the locations of the vent pipes 21 may be determined with reference to the correspondence to the internal pumps, not shown, which are arranged along the circumferential direction of the reactor core disposed in the RPV 2.

According to this structure, the connecting vent 20 may be partially formed as concrete section as shown in FIG. 2 for strengthening the structure of the pedestal 12.

A preferred modification of the present invention will be described hereunder with reference to FIGS. 3 and 6.

Figure 3:
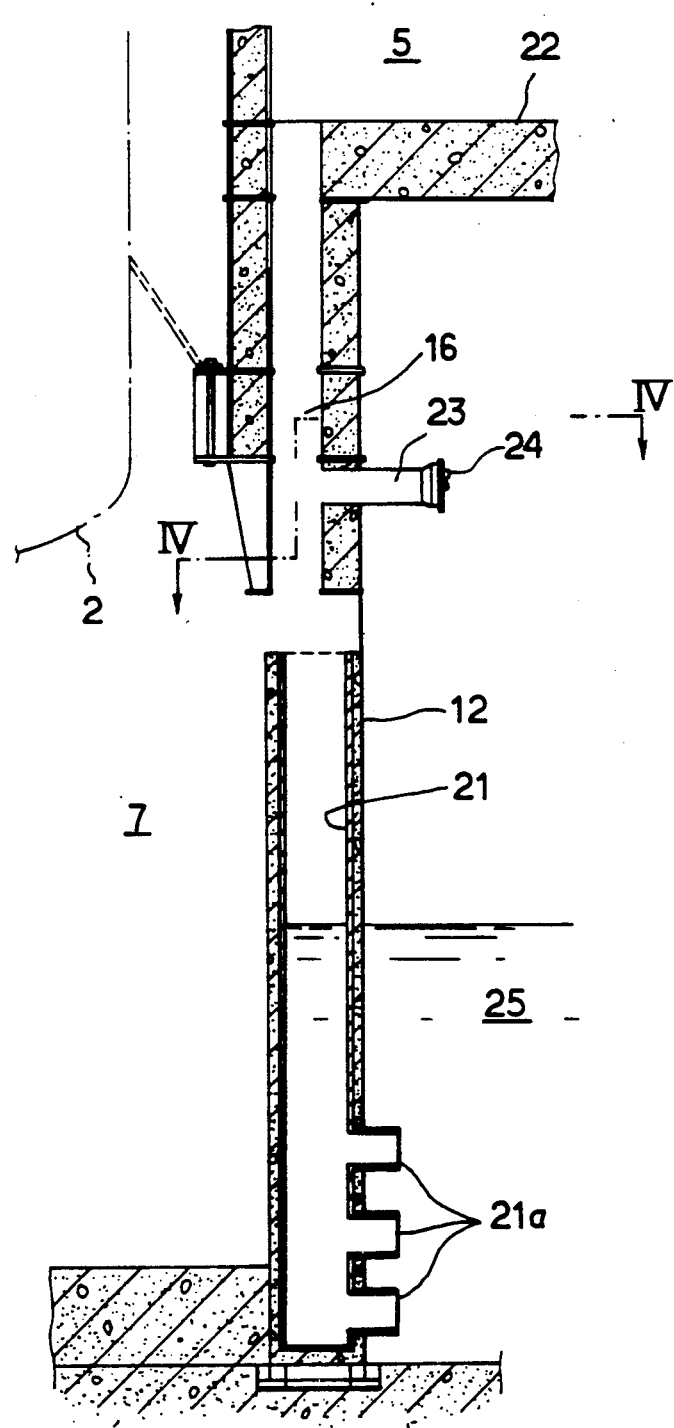
FIG. 3 is a partial elevational section of the pedestal according to a modified embodiment of the present invention.
Figure 4:
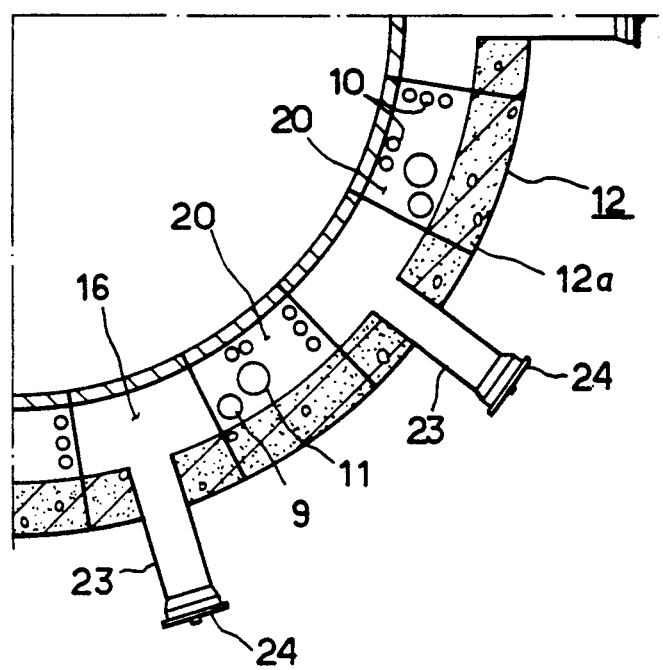
FIG. 4 is a partial sectional view of the pedestal of FIG. 3 taken along the line IV—IV in FIG. 3.
Figure 9:
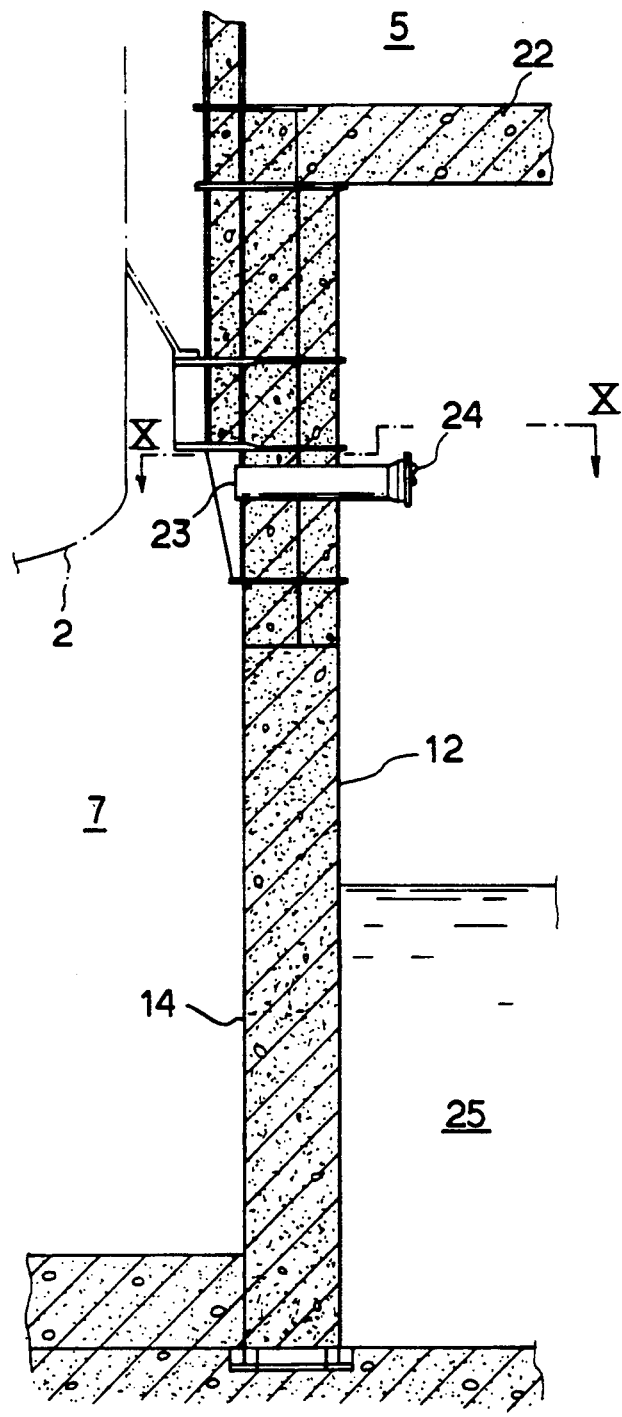
FIG. 9 is an elevational section similar to that of FIG. 3, but is related to the conventional structure.
Figure 10:
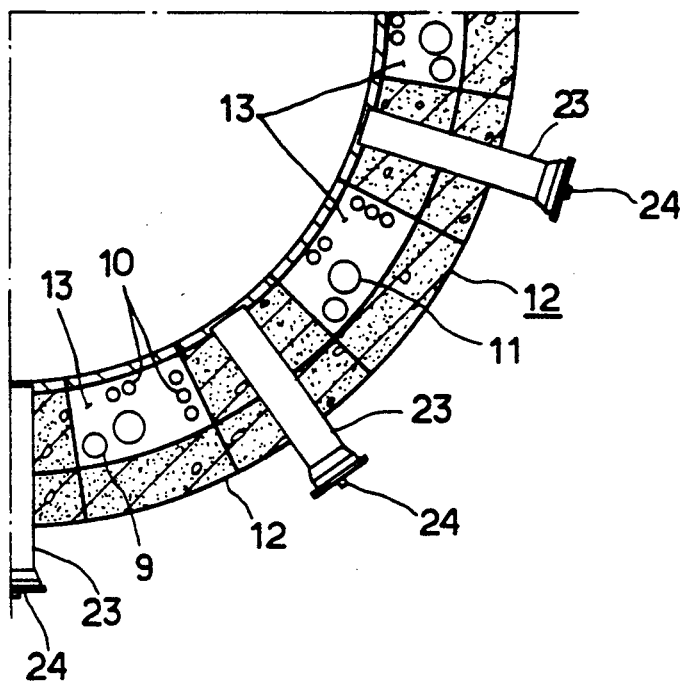
FIG. 10 is an sectional view similar to that of FIG. 4, but is related to the conventional structure.

First, as shown in FIG. 3, which is similar to the elevational section of FIG. 9, the vacuum breaker 24 and the fixing pipe 23 are arranged by utilizing the vacant space 16 above the vent tube 21 disposed in the concrete wall section 12a. Accordingly, the construction or arrangement of the vacuum breaker 24 and the fixing pipe 23 can be easily done without being obstructed by the arrangement of the line 9, the cables 10 and the duct 11. This will be also understood from FIG. 4.

Figure 5:
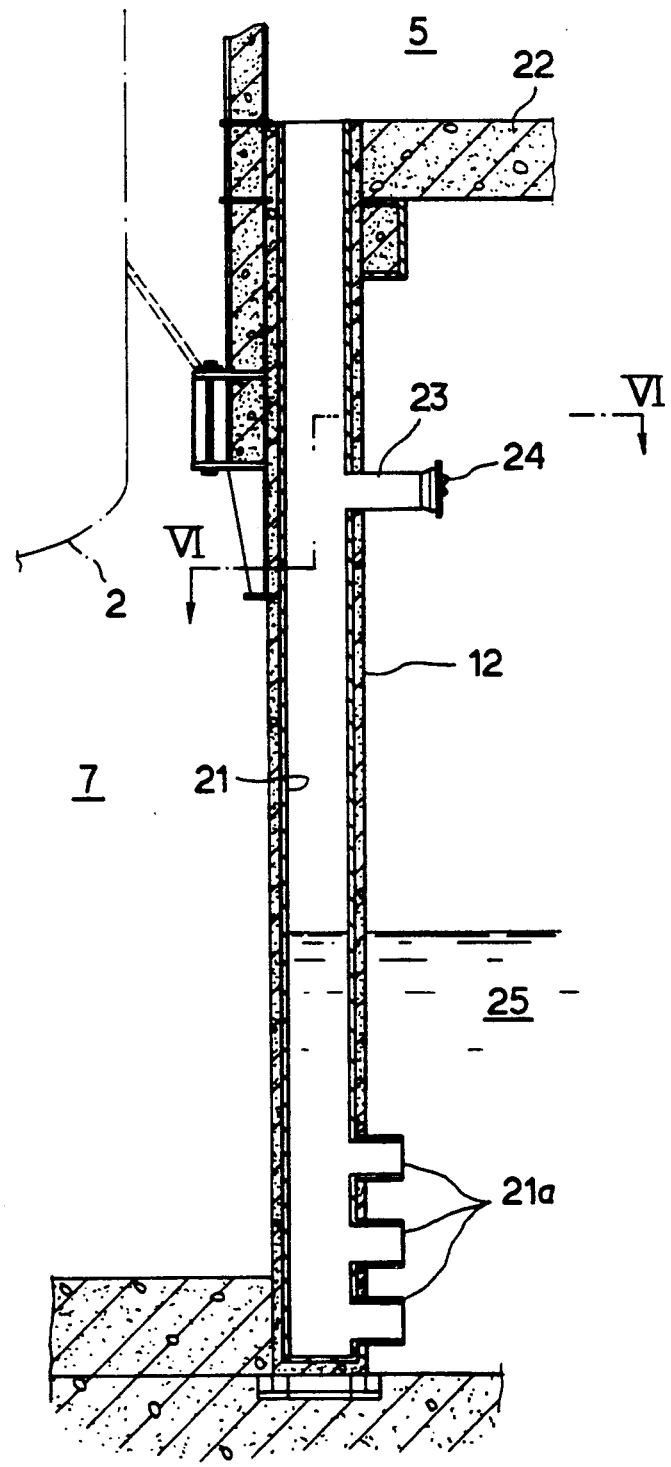
FIG. 5 is a partial elevational section of the pedestal according to a further modified embodiment of the present invention.
Figure 6:
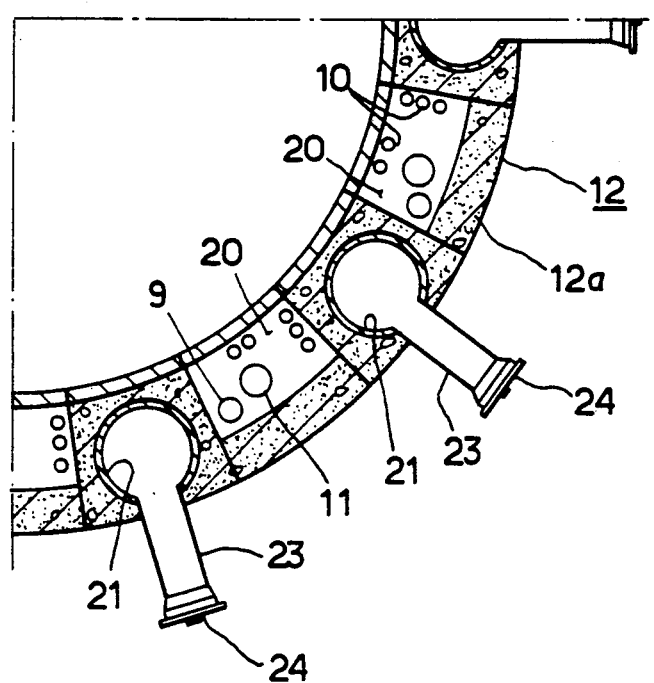
FIG. 6 is a partial sectional view of the pedestal of FIG. 5 taken along the line VI—VI in FIG. 5.

Next, as shown in FIGS. 5 and 6 as an alternation, the vent pipes 21 each being disposed in the concrete wall section 12a and having an extended portion are arranged adjacent to the connecting vent sections. Namely, each of the vent pipes 21 extends upward to the diaphragm floor 22 and opened to the space in the upper drywell 5 and the vacuum breaker 24 is directly connected to the extended portion of the vent pipe 21 through the fixing pipe 23. In this embodiment, the construction or arrangement of the vacuum breaker 24 can be easily done.

What is claimed is:

1. A reactor containment vessel having an outer wall structure an inside of which is divided into upper and lower drywells by means of a diaphragm floor and in which a suppression chamber is arranged, a reactor pressure vessel is supported by a pedestal and a line, a cable and a duct are disposed in and between the upper and lower drywells, said pedestal having a cylindrical structure surrounding the reactor pressure vessel, said pedestal comprising a plurality of concrete wall sections and a plurality of connecting vent sections which are arranged alternately along a circumferential direction of the cylindrical pedestal, wherein the line, the cable and the duct are arranged in each of the connecting vent sections and a vent pipe is arranged in each of the concrete wall sections so that the line, the cable and the duct and the vent pipe occupy different positions in their cross sections, said vent pipe having an open end opened to the drywell.

2. A reactor containment vessel according to claim 1, wherein each of the connecting vent sections is composed of a hollow passage section and a concrete wall section.

3. A reactor containment vessel according to claim 1, wherein a vacuum breaker means is further disposed in the reactor containment vessel at a portion above the open end of the vent pipe, said vacuum breaker means including a fixing pipe for mounting a vacuum breaker to the pedestal, said fixing pipe having one end opened to the drywell.

4. A reactor containment vessel according to claim 1, wherein said vent pipe has an end portion extended to the diaphragm floor and opened to the drywell and wherein a vacuum breaker means is further disposed in the reactor containment vessel, said vacuum breaker means being mounted to the extended portion of the vent pipe and including a fixing pipe for mounting a vacuum breaker to the pedestal, said fixing pipe having one end opened to an inside of the vent pipe.

* * * * *